United States Patent [19]

Scholz et al.

[11] 4,335,091
[45] Jun. 15, 1982

[54] PROCESS FOR THE MANUFACTURE OF HYDROXYLAMMONIUM PERCHLORATE

[75] Inventors: Eugen Scholz, Garbsen; Wolfgang Sievert, Wunstorf, both of Fed. Rep. of Germany

[73] Assignee: Riedel-de Haen Aktiengesellschaft, Seelze/Hannover, Fed. Rep. of Germany

[21] Appl. No.: 281,844

[22] Filed: Jul. 9, 1981

[30] Foreign Application Priority Data

Jul. 11, 1980 [DE] Fed. Rep. of Germany ....... 3026293

[51] Int. Cl.³ .............................................. C01B 11/16
[52] U.S. Cl. .................................................... 423/476
[58] Field of Search ................................ 423/386, 476

[56] References Cited

U.S. PATENT DOCUMENTS

| 1,284,380 | 11/1918 | Le Sueur | 423/476 |
| 1,303,167 | 5/1919 | Collett | 423/476 |
| 1,342,956 | 6/1920 | Given et al. | 423/476 |
| 2,768,874 | 10/1956 | Robson | 423/386 |
| 3,110,558 | 11/1963 | Markowitz et al. | 423/386 |
| 3,420,621 | 1/1969 | Watters et al. | 423/462 |
| 3,502,430 | 3/1970 | Sanlaville | 423/476 |
| 3,781,412 | 12/1973 | Rhees | 423/476 |
| 3,928,546 | 12/1975 | Guzzo | 423/476 |
| 4,066,736 | 1/1978 | Liggett | 423/386 |

OTHER PUBLICATIONS

Schumacher et al., "Large-Scale Continuous Production of Ammonium Perchlorate", *Chemical Engineering Progress*, Sep. 1957, (vol. 53, No. 9, pp. 428-432.

*Primary Examiner*—O. R. Vertiz
*Assistant Examiner*—Wayne A. Langel
*Attorney, Agent, or Firm*—Curtis, Morris & Safford

[57] ABSTRACT

Hydroxylammonium perchlorate is obtained by reacting a perchlorate-free hydroxylammonium salt with a perchlorate ions-donating compound, the reaction being carried out in aqueous solution with the aid of a cation exchanger, in parallel flow or preferably in countercurrent direction. The hydroxylammonium perchlorate is obtained in a high yield and in a high purity. It is suitable as oxidant in fuels.

2 Claims, No Drawings

PROCESS FOR THE MANUFACTURE OF HYDROXYLAMMONIUM PERCHLORATE

The present invention relates to a process for the manufacture of hydroxylammonium perchlorate by reacting a perchlorate-free hydroxylammonium salt with a perchlorate ions-donating compound.

The manufacture of hydroxylammonium perchlorate (HAP) has been known for a long time. The reaction of hydroxylammonium hydrochloride or hydroxylammonium sulfate with barium perchlorate has been described as early as 1956 in U.S. Pat. No. 2,768,874, the reaction being carried out in the presence of absolute ethanol as the solvent, followed by recrystallization, to give a yield of HAP, in the form of white crystals having a melting point in the range of from 87.5° to 89.0° C., of 55%. U.S. Pat. No. 3,420,621 discloses a similar process, which is based on the reaction of hydroxylammonium hydrochloride or hydroxylammonium sulfate with sodium perchlorate in alcoholic, preferably methanolic, solution, followed by removal of the by-products by precipitation with an ether. Both known processes have the disadvantage that they have to be carried out with the use of an organic solvent, which must be recovered and that HAP is contaminated by incompletely removed by-products.

It is further known to prepare HAP by reacting hydroxylammonium sulfate with barium perchlorate in an aqueous medium (cf. Chemical Abstracts, vol. 56 (1962), page 2142). This process has the disadvantage that excess hydroxylammonium sulfate has to be removed carefully by back-titration with barium carbonate.

It is the object of the present invention to provide a process for the manufacture of HAP of high purity and in high yield without great technical expenditure.

Subject of the present invention therefore is a process for the manufacture of hydroxylammonium perchlorate by reacting a perchlorate-free hydroxylammonium salt with a perchlorate ions-donating compound, which comprises carrying out the reaction in aqueous solution with the aid of a cation exchanger.

The process according to the invention is carried out as parallel flow process, in which loading of the exchanger and the elution step are carried out in the same direction of flow or, preferably, as countercurrent process, in which loading and elution are carried out in opposed directions of flow. The process is carried out especially advantageously with the use of several series-connected columns operated alternately in parallel flow and in countercurrent direction.

Suitable starting materials are commercial hydroxylammonium salts, for example hydroxylammonium sulfate or hydroxylammonium hydrochloride, which are reacted with a perchlorate ions-donating compound, that is a compound of the formula

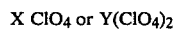

$$X\,ClO_4 \text{ or } Y(ClO_4)_2$$

wherein X is a hydrogen atom or an alkali metal atom and Y is an alkaline-earth metal atom. Suitable compounds are perchloric acid, which is used, preferably in the form of a 5 to 20 weight % aqueous solution, potassium perchlorate, sodium perchlorate, calcium perchlorate and barium perchlorate.

As cation exchanger there is used preferably according to the invention a cation exchanger of highly acidic nature, in particular a cation exchanger containing carboxy groups or sulfonic acid groups and which is based on a synthetic resin, for example a phenol sulfonic acid condensate or a styrene sulfonic acid polymer. These cation exchangers are commercially available. Using cation exchangers in the synthesis of HAP has the advantage that the resulting aqueous HAP solution is free from secondary impurities. This solution contains neither anions originating from the hydroxylammonium salt nor cations originating from the perchlorate component. Metal ions, which may be present in the starting material, do not pass into the final products either.

The process according to the invention is carried out substantially in two steps, the first step consisting of loading the exchanger with a perchlorate-free hydroxylammonium salt dissolved in water and the second step consisting of eluting the exchanger with an aqueous solution of a perchlorate ions-donating compound. The eluate obtained is an aqueous HAP solution having a concentration of from 10 to 15 weight %, which can be concentrated by removing the water under gentle conditions, that means at a temperature of from 30° to 70° C. and a pressure of from 20 to 150 mbar. The eluate is suitably washed with water in the same direction of flow. HAP can be isolated from the eluate and the washing water in a total yield of at least 98 weight %, referred to the perchlorate-containing eluent. HAP is obtained in solid from upon recrystallization, preferably under reduced pressure, the crystals having a melting point of from 88° to 89° C. (differential thermoanalysis) and a purity of at least 99%.

The HAP obtained according to the invention is particularly suitable as oxidant in fuels of solid or liquid nature.

The following examples serve to illustrate the invention; percentages are by weight.

EXAMPLE 1

A cylindrical ion exchanger column of 8 cm diameter and 50 cm length is charged with 2 liters of a commercial, highly acid cation exchanger based on a styrene sulfonic acid polymer. The column has a total capacity of 4.8 gram-equivalents. The exchanger is loaded by introducing a solution of 492 g (6 gram-equivalents) of hydroxylammonium sulfate in 4 liters of water at the top of the column within a period of 2 hours. Next, the exchanger is washed with water until the running-off liquid is free from sulfate. Elution is carried out by introducing at the top of the column a solution of 400 g (3.28 gram-equivalents) of sodium perchlorate in 2 liters of water within a period of 3 hours and passing said solution over the exchanger in downward direction. The exchanger is subsequently washed with 2 liters of water in the same direction of flow. The washing water is combined with the eluate to yield a mixture which contains 430 g (3.22 gram-equivalents; 98% of the theory) of HAP; sulfate ions and sodium ions cannot be found in the eluate.

EXAMPLE 2

Example 1 is repeated, but with the use of 2 liters of a 17.5% aqueous perchloric acid (3.5 gram-equivalents) instead of the sodium perchlorate solution. The solution obtained upon combination of the eluate and the washing water contains 465 g (3.5 gram-equivalents; 99.6% of the theory) of HAP; sulfate ions cannot be found in the eluate.

EXAMPLE 3

Example 1 is repeated, using, however, instead of the sodium perchlorate solution, a solution of 400 g of perchloric acid (17.5% strength) and 112 g of calcium oxide in 2 liters of water. This solution contains 4 gram-equivalents of calcium perchlorate. The solution obtained upon combination of the eluate and the washing water contains 530 g (3.97 gram-equivalents, 99% of the theory) of HAP; calcium ions and sulfate ions cannot be found in the eluate. The HAP solution is concentrated in a rotation evaporator at a temperature of 40° C., leaving a crystal slurry. The HAP left after recrystallization has a melting point of 88° C. and a purity of 99%.

EXAMPLE 4

This example is carried out in an exchanger installation consisting of 2 cylindrical columns of 1 m diameter and of 3.2 m height each. Each column is charged with 2,000 liters of a commercial highly acid cation exchanger based on a styrene sulfonic acid polymer. The installation has a total capacity of 9.6 kilogram-equivalents. The exchanger is loaded by pumping a solution of 1,000 kg (12.2 kilogram-equivalents) of hydroxylammonium sulfate in 6,000 liters of water through the series-connected columns in a manner such that the first column is charged in downward direction and that the second column is charged in upward direction. Thereafter the exchanger is washed with water until the flowing-off liquid is free from sulfate. Elution is carried out by pumping a solution of 587 kg (4.8 kilogram-equivalents) of sodium perchlorate in 3,000 liters of water through both columns within 2 hours in a manner such that the solution is first fed in at the top of the second column and withdrawn at the bottom thereof and subsequently fed in at the top of the first column and withdrawn at the bottom thereof. The exchanger is subsequently washed with 3,000 liters of water in the same direction of flow. The eluate is combined with the washing water, the resulting mixture containing 635 kg (4.76 kilogram-equivalents; 99% of the theory) of HAP. Sulfate ions and sodium ions cannot be found in the eluate.

This step of charging and eluating may be repeated frequently without observing a decrease in yield.

What is claimed is:

1. A process for the manufacture of hydroxylammonium perchlorate comprising the steps of
   (a) loading a cation exchanger with a perchlorate-free hydroxylammonium salt dissolved in water; and
   (b) eluating the loaded exchanger with an aqueous solution of a perchlorate ions - donating compound to obtain an aqueous hydroxylammonium perchlorate solution.
2. The process of claim 1, which comprises carrying out the reaction in countercurrent direction.

* * * * *